(12) United States Patent
Cummings et al.

(10) Patent No.: US 7,496,594 B1
(45) Date of Patent: Feb. 24, 2009

(54) USER INTERFACE FOR DISPLAYING A HIERARCHICAL STRUCTURE OF A COMPUTER SYSTEM

(75) Inventors: Patrick W. Cummings, Ramsey, MN (US); Mitch M. Maurer, Brooklyn Park, MN (US); Thomas P. Sherren, Andover, MN (US); Anne M. Steiner, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 252 days.

(21) Appl. No.: 11/148,146

(22) Filed: Jun. 8, 2005

(51) Int. Cl.
*G06F 17/30* (2006.01)
*G06F 15/16* (2006.01)

(52) U.S. Cl. .................. 707/102; 709/220; 718/104; 717/178; 717/121; 715/700

(58) Field of Classification Search .............. 707/100; 709/220; 718/104; 717/178, 121; 715/700
See application file for complete search history.

(56) References Cited

U.S. PATENT DOCUMENTS

| | | | | |
|---|---|---|---|---|
| 6,650,347 | B1 * | 11/2003 | Nulu et al. .................. | 715/853 |
| 2003/0041088 | A1 * | 2/2003 | Wilson et al. ............... | 709/104 |
| 2003/0154204 | A1 * | 8/2003 | Chen-Wright et al. ...... | 707/100 |
| 2005/0091346 | A1 * | 4/2005 | Krishnaswami et al. ..... | 709/220 |
| 2005/0246704 | A1 * | 11/2005 | Romm et al. ............... | 717/178 |
| 2006/0225039 | A1 * | 10/2006 | Smith ......................... | 717/121 |

OTHER PUBLICATIONS

SCILnet, "The Windows Registry" (http://scilnet.fortlewis.edu/tech/NT-Server/registry.htm), Mar. 7, 2001.*
Kathy Iven, "Optimizing the Windows Registry" (http://www.windowsitlibrary.com/Documents/Book.cfm?DocumentID=368), Feb. 1998, IDG Books.*
Sun Microsystems "Sun Mainfram Rehosting Software, Leveraging Mainframe Assets on Sun";http://www.sun.com/servers/wp/docs/Sun_Mainframe_Rehosting_SW.pdf; Apr. 2003.*

* cited by examiner

*Primary Examiner*—Tony Mahmoudi
*Assistant Examiner*—Dennis Truong
(74) *Attorney, Agent, or Firm*—Charles A. Johnson; Robert Marley; Shumaker & Sieffert PA (57) ABSTRACT

A user interface is described that displays a hierarchical structure of a computer system. The hierarchical structure of a system configuration for a computer system is formed by the upward and downward connections between various levels of symbolic and real hardware components. In particular, the user interface displays a graphical model of the hierarchical tree-like structure of the configuration in a single computer window. An individual hardware component may have multiple upward connections to separate parent hardware components. An individual hardware component may be represented by more than one node within the model, yet a single data structure is maintained for each of the hardware components. In this manner, users may interact with the user interface to more easily view, comprehend, and manage configuration data for a computer system.

18 Claims, 7 Drawing Sheets

USER INTERFACE FOR DISPLAYING A HIERARCHICAL STRUCTURE OF A COMPUTER SYSTEM

TECHNICAL FIELD

The invention relates to computer systems and, more particularly, to computer-implemented techniques for displaying a user interface for a computer system.

BACKGROUND

Existing systems for managing the configuration of commercially-available OS2200 systems or other operating systems running on high-end mainframe computers display the hierarchical structure of the system configuration using text menus. Text menu based configuration management systems enable a user to view and manage a text representation of a single level of the hierarchical structure for an OS2200 system configuration via a screen on a user interface.

In general, the hierarchical structure of an OS2200 system configuration is formed by the upward and downward connections or parent and child relationships between various levels of symbolic and real hardware components. Since real or symbolic hardware components in an OS2200 system configuration can have more than one upward connection to a parent hardware component, the hierarchical structure may include multiple instances of a single hardware component. For example, an input-output (I/O) hardware component, such as a disk or tape drive, can have multiple upward connections to different control units. Accordingly, the hierarchical structure includes an instance of the drive for each upward connection to a different control unit.

In another example, the hierarchical structure may include multiple instances of a subsystem. A subsystem is a symbolic hardware component that represents connections between an I/O channel and one or more control units. A particular system configuration may include multiple subsystems, with different subsystems having different rules for connectivity. A subsystem may have multiple upward connections to a single channel, or may have multiple upward connections to different channels. In any case, separate instances of a single subsystem may have different configurations, i.e., may have a different mapping of connections between control units and a channel. Consequently, the hierarchical structure of an OS2200 system configuration forms a tree-like structure rather than a true tree structure since a single hardware component can have multiple upward connections.

Text menu based configuration management systems enable a user to traverse the hierarchical tree-like structure of the system configuration through a hierarchy of text menus. Each menu or screen displays a text representation of the selected level of configuration to the user. The user can navigate to a desired level of configuration by selecting text items from a menu. When the user selects a text item from a menu, the user is presented with an associated submenu that displays the selected subset of the hierarchical structure. Thus, a user must view numerous screens in order to view the parent/child relationship between the various levels of hardware components. In other words, a user must traverse the hierarchical structure by switching from screen to screen to discern what hardware components are in the system configuration and how the hardware components are connected and configured. Alternatively, a user may print configuration and connection reports, or draw a configuration may by hand in order to a see a full view of the hierarchical structure.

SUMMARY

In general, the invention is directed to techniques for presenting a user interface that displays a hierarchical structure of a computer system. In particular, the techniques are designed to display a graphical tree representing the hierarchical tree-like structure of the configuration of a high-end mainframe, such as an OS2200 system, in a single screen via a user interface. In this manner, the techniques allow a user to trace connections between the various levels of hardware components (physical or symbolic) included in a system configuration by expanding nodes in the graphical tree of the hierarchical structure, even though many of the hardware components may have multiple upward and downward relationships with other hardware components.

As described herein, the techniques present a user interface with which a user interacts to view the hierarchical structure of a computer system. The user interface may display the hierarchical structure of an OS2200 system configuration as a plurality of nodes arranged to form a graphical model. However, in contrast to a standard tree model, an individual hardware component may be represented by more than one node. Exemplary physical hardware components that may have multiple upward connections include control units and peripheral hardware components, such as input-output (I/O) hardware components. In general, each upward connection of an individual hardware component is visually represented by a node in the tree view and thus serves as a bookmark to the location of an upward connection of the individual hardware component.

For example, a physical individual hardware component, such as a drive, may have multiple upward connections to separate control units. Accordingly, a node identified by the drive name may be displayed within the graphical hierarchy for each instance of the drive within the hierarchical structure, i.e., for each upward connection to a parent hardware component. In this manner, the techniques are useful for viewing system configurations, such as an OS2200 system configuration, having a tree-like hierarchical structure in which an individual hardware component of the computer system may have multiple upward connections to separate parent hardware components.

Additionally, a symbolic hardware component, such as a subsystem, may also have multiple upward connections, and can be accurately represented within the user interface using the techniques of the present invention. A subsystem in an OS2200 system configuration is a symbolic hardware component that provides a mapping of channel to control unit connections. An OS2200 system configuration may include multiple subsystems, each having different well-defined connectivity rules. Thus, a user may more easily define channel to control unit connections by defining a subsystem rather than defining each individual connection between a channel and multiple control units. In particular, a specific subsystem may have multiple upward connections to separate channels. However, each specific instance of the subsystem that is connected to a separate channel may have a different mapping of downward connections to the control units in accordance with the connectivity rules associated with the specific subsystems. Accordingly, a subsystem node bridges the gap between a channel and one or more control units within the graphical hierarchy. Each instance of the subsystem may be identified by the specific subsystem name and visually represented by a subsystem node within the graphical hierarchy.

In general, a configuration software module operating on the computer system maintains data structures to store configuration data associated with each individual hardware component of the computer system. Each of the data structures may be associated with a different one of the individual hardware components, such as a control unit, I/O hardware component, or other physical hardware component, and may, for example, include a list of upward connections to parent hardware components, a list of downward connections to child hardware components, a list of attributes associated with the individual hardware component, and a list of tree item handles that identify the position of each node associated with the individual hardware component within the graphical hierarchy. Each data structure may be identified by the name of the associated hardware component and may be stored in memory of the component system as a computer programming object in which the lists of upward and downward connections are stored as lists of parent and child hardware component names, respectively. Additionally, the list of tree item handles may comprise a list of pointers that point directly to each specific position in the graphical hierarchy at which an instance of the individual hardware component is located.

The configuration software module may also maintain a single data structure store configuration data for each subsystem or other symbolic hardware component. In particular, a data structure associated with a particular subsystem may store a list of control units to which the subsystem may connect, and a map of connection objects that store a list of channels connected to each control unit. Specifically, the map includes a connection object for each control unit associated with the subsystem. Each connection object may store a list of channels that are connected to a single control unit. Thus, a mapping of channel to control unit connections for a particular subsystem can be generated from the configuration data stored in the associated data structure.

A user interface software module executing on a remote user station displays the configuration data stored in the data structures as a tree that models the hierarchical tree-like structure in a single screen of the user interface. In particular, the user interface displays the hierarchical tree-like structure of an OS2200 system configuration as a tree by visually representing each upward connection of a hardware component as a separate node. In particular, the user interface software module displays the model of the hierarchical structure by retrieving configuration data stored in the data structures. A user may interact with the user interface to enter input associated with a hardware component. As an example, a user may enter input by expanding or collapsing a node or, alternatively, by selecting an item from a context menu presented to the user. The context menu may include one or more items which the user can select to update of modify configuration data. For example, the configuration software module may update configuration data by adding or deleting a connection to an individual hardware component, renaming an individual hardware component, or otherwise modifying configuration data associated with an individual hardware component.

In one embodiment, the invention is directed to a computer-implemented method comprising maintaining one or more data structures to store configuration data of a computer system having a plurality of hardware components. The method further comprises presenting a user interface to display the configuration data in a hierarchical tree-like structure in a single window. The hierarchical tree-like structure includes a plurality of nodes that represent the same individual hardware component of the computer system.

In another embodiment, the invention is directed to a system comprising a host computer system that includes a configurable hardware architecture comprising a plurality of hardware components. A configuration software module executes on the host computer system and maintains one or more data structures to store configuration data for the host computer system. A user interface software module executes on the host computer system to present a user interface that graphically displays the configuration data in a hierarchical tree-like structure in a single window. The hierarchical tree-like structure includes a plurality of nodes that represent the same individual hardware component of the computer system.

In another embodiment, the invention is directed to a system comprising means for maintaining one or more data structures to store configuration data associated with hardware components of the computer system, and means for presenting a user interface that displays in a single computer window a graphical, hierarchical tree-like structure having a plurality of nodes to provides access to the entire configuration data for the hardware components of the computer system. At least one of the hardware components is a child hardware component associated with two or more parent hardware components, and the hierarchical tree-like structure includes two or more of the nodes that provide access to the configuration data associated with the same child hardware component.

The invention may provide one or more advantages. For example, unlike text menu based configuration management systems in which a user traverses the tree-like hierarchical structure of an OS2200 system configuration by switching from screen to screen in a hierarchy of text menus, the described techniques allow a user to view a graphical representation of the full hierarchical tree-like structure via a single screen of a user interface. Consequently, a user may view and understand the parent/child relationship between various levels of hardware components within the system by simply expanding and collapsing nodes within the graphical hierarchy rather than having to print configuration and connection reports or manually drawing a configuration map of the hierarchical structure. Furthermore, a single data structure may store configuration data for each individual hardware component of the system, and a user may enter input via the user interface to manage the configuration data of an OS2200 system configuration. In this manner, the described techniques maintain data integrity and enable a user to more easily and efficiently create, comprehend, and manage an OS2200 system configuration.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
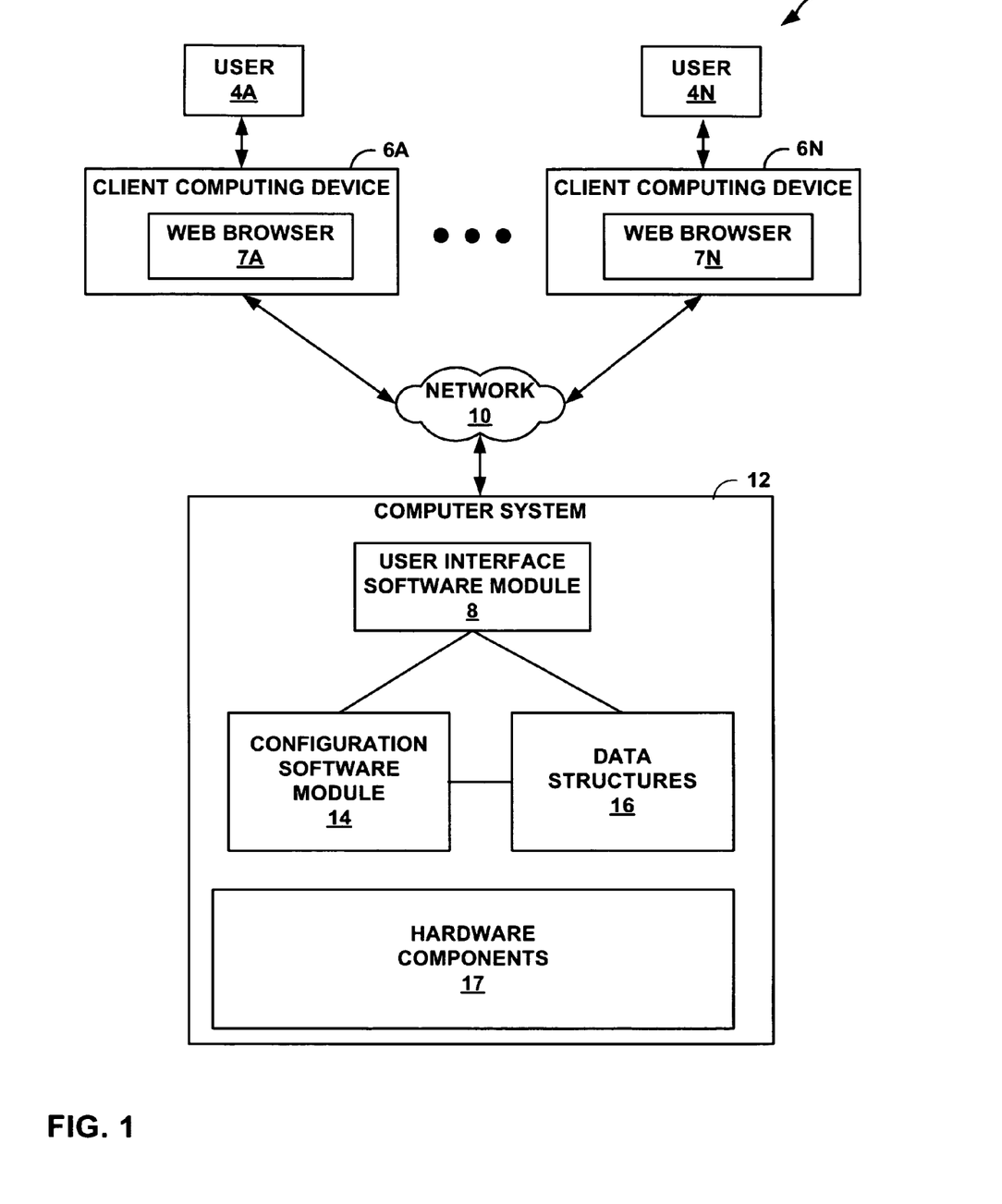
FIG. 1 is a block diagram illustrating an exemplary system in which users interact with a user interface to manage a configuration of a computer system in accordance with an embodiment of the invention.

FIG. 1 is a block diagram illustrating a system 2 in which a computer system 12 presents a user interface with which users 4A-4N (collectively, "users 4") interact to manage configuration data for computer system 12 in accordance with the techniques described herein. As shown in FIG. 1, computer system 12 is communicatively coupled to a number of computing devices 6A-6N (collectively, "computing devices 6") by a network 10. Computing devices 6 include web browser modules 7A-7N (collectively, "web browsers 7"), respectively for remotely interacting within computer system 12. Although not shown, computer system 12 may be directly coupled to a local display and input/output devices (e.g., a keyboard and pointing device) by which a local user directly interacts with computer system 12. In any event, user interface software module 8 of computer system 12 operates as a means for presenting a user interface with which users 4 interact to manage configuration data for computer system 12.

Computer system 12 may, for example, include a mainframe computer system, a server, or other computer system having a hardware architecture that can be configured by users 4 interacting with computing devices 6. In particular, computer system 12 may comprise for example, a computer system having a system configuration in which an individual hardware component may have multiple upward connections to separate parent hardware components, such as a ClearPath Plus™ server with an OS2200 system configuration, or other servers developed by Unisys Corporation of Blue Bell, Pa.

Users 4 may use a variety of computing devices 6 to manage configuration data for computer system 12. For example, users 4 may manage configuration data for computer system 12 using a workstation, a laptop computer, a desktop computer, or other computing hardware components. Network 10 represents any communication network, such as a local area network (LAN). Users 4 may access computer system 12 via a LAN to manage configuration data for computer system 12, or may remotely access computer system 12 via a virtual private network, remote dial-up, or a similar remote access communication mechanism.

As will be described in detail herein, user interface software module 8 presents a user interface with which users 4 interact to create, view, and manage configuration data for computer system 12. In particular, user interface software module 8 provides a graphical representation of the hierarchical tree-like structure of computer system 12 with which users 4 interact to enter and update configuration data, or generally manage configuration data for computer system 12.

In the illustrated example of FIG. 1, user interface software module 8 presents a user interface that displays a graphical model of the entire hierarchical tree-like configuration of computer system 12 in a single window. In particular, user interface software module 8 may display the hierarchical structure of computer system 12 as a plurality of graphical nodes arranged in a plurality of levels to form a tree model. In contrast to a standard tree model, however, an individual hardware component of computer system 12 may be represented by more than one node. In other words, the same individual hardware computer may be represented by two or more different nodes within the graphical hierarchy displayed by user interface software module 8.

Rather than switch from screen to screen in a hierarchy of text menus, users 4 may trace connections between various levels of hardware components 17 included in the hierarchical structure of computer system 12 by simply expanding and collapsing nodes in the graphical hierarchy. In this manner, users 4 may view and understand the parent/child relationships between various levels of hardware components 17 of computer system 12 in a single screen of a user interface presented by user interface software module 8 rather than printing configuration and connection reports or manually drawing a configuration map of the hierarchical structure.

In this manner, the graphical model provides a visual representation of connections between various levels of physical and symbolic hardware components 17 in the hierarchical tree-like structure of computer system 12. Exemplary hardware components 17 of computer system 12 include physical hardware components that form the hardware architecture of computer system 12, such as memory modules, power domains, input-output (I/O) bridges that have I/O bridge slots that receive I/O processors (IOPs), IOP buses having slots into which IOP channels can plug to connect to control units, and peripheral hardware components such as printers, keyboards, tape drives, disk drives, and other I/O hardware components.

In a complex computing system, such as an OS2200 system, a physical hardware component, such as a disk or tape drive, may have multiple upward logical or physical connections to separate different control units. User interface software module 8 visually represents each instance of the hardware component within the graphical tree-like model by a separate node identified by the name of the particular drive. In other words, in a case where a hardware component has multiple upward connections, the hierarchical tree-like structure includes a plurality of nodes that represent the same individual hardware component of the computer system within different positions of the structure.

In addition to physical hardware components, a symbolic hardware component, such as a logical subsystem, may also be visually represented as a node within the graphical tree. For example, a subsystem in an OS2200 system configuration provides a mapping of channel to control unit connections. Since the mapping of channel to control unit connections may be different for each channel, the graphical hierarchy may visually represent each upward connection of a subsystem, i.e. each mapping between a single channel and multiple control units, as a node identified by the name of the subsystem. An OS2200 system configuration may include different types of subsystems having different sets of well-defined connectivity rules. Thus, a user may more easily define channel to control unit connects by defining a subsystem rather than defining each individual connection between channels and control units. Additionally, visually representing the mapping of channel to control unit connections may enable users 4 to more easily view and understand the hierarchical tree-like structure of computer system 12.

User interface software module 8 displays the graphical hierarchy of the hierarchical tree-like structure of computer system 12 based on configuration data for computer system 12. Computer system 12 includes data structures 16 to store configuration data for hardware components 17. Configuration module 14 operates as a means for maintaining (i.e., updating) data structures 16 based on input received by user interface software module 8. Data structures 16 may be stored within one or more memory modules of computer system 12, and may comprise linked-lists, tables, arrays, databases or other suitable structures.

In one embodiment, configuration module 14 maintains a corresponding data structure for each of hardware components 17 of computer system 12. Configuration module 14 may organize the data structure hierarchically to mirror the hierarchical relationships between hardware components 17. For example, within each data structure, configuration module may store a list of upward connections to parent hardware components a list of downward connections to child hardware components, a list of attributes, and a list of tree item handles that identify the position of each node within the graphical hierarchy that is associated with the particular hardware component. In another example, configuration module 14 may maintain a single data structure associated with a subsystem to store configuration data from which a mapping of channel to control unit connections can be generated. In any case, a data structure associated with an individual hardware component may store configuration data associated with the status, connectivity, and location of each instance of the individual hardware component within the graphical hierarchy, and may be identified by the name of the individual hardware component.

In order to display the graphical hierarchy of the hierarchical tree-like structure of computer system 12, user interface module 8 retrieves configuration data stored in data structures 16. As previously described, user interface module 8 presents the graphical hierarchy as a graphical representation of upward connections between individual hardware components. Users 4 may interact with the nodes forming the graphical hierarchy to selectively expand and collapse various levels of configuration within the graphical hierarchy. User interface module 8 may control the appearance of each node to include visual aids indicative of whether downward connections exist for display or whether the associated hardware component is available, i.e., the connectivity status of the associated hardware component. As a result, users 4 may selectively trace (i.e., follow) logical and physical connections between nodes of the graphical hierarchy to view and understand the parent/child relationship between various levels of hardware components 17 of computer system 12.

User interface software module 8 may provide added functionality to further assist users 4 in managing configuration data. For example, user interface module 8 may provide dynamic, task-oriented context or shortcut menus. More specifically, users 4 may select, e.g., via a "right mouse click" any node within the graphical hierarchy, thereby causing user interface module 8 to present a context-sensitive shortcut menu to related configuration management tasks. As an example, a shortcut menu may allow users 4 to select one of a number of operations associated with the selected node, such as adding or removing the node, changing the connectivity status of the individual hardware component associated with the node, and adding a connection to one of a list of hardware components. In response to a selection, configuration module 14 updates configuration data stored in the associated one of data structures 16, and user interface software module 8 refreshes the graphical hierarchy based on the received input.

To further provide an easy-to-use, yet powerful user interface, user interface module 8 may simultaneously display an interrelated "information screen" when displaying the graphical hierarchy. In particular, user interface module 8 may split a single screen of the user interface into two portions to simultaneously display the graphical hierarchy and the information screen adjacent to one another. The information screen may display configuration data associated with a selected node of the graphical hierarchy in addition to configuration data associated with the overall hierarchical structure of computer system 12. As an example, the first portion of the screen displays the hierarchy by which the user selects nodes, and the second portion displays a text representation of the configuration data for the corresponding hardware component. User interface software module 8 may display the configuration data in the form of a table, and may include a general text description about the selected hardware component. In addition, the user interface software module 8 may display a text description providing an overview of the number of hardware components 17 represented in the graphical hierarchy of computer system 12. The table describing a selected one of hardware components 17 may include a column listing a number of properties associated with the selected hardware component and an adjacent column listing the corresponding property values. In this manner, the user interface presented by user interface software module 8 may allow users 4 to easily view and comprehend the parent/child relationship between the various levels of hardware components 17 and efficiently manage configuration data for computer system 12.

Figure 2:
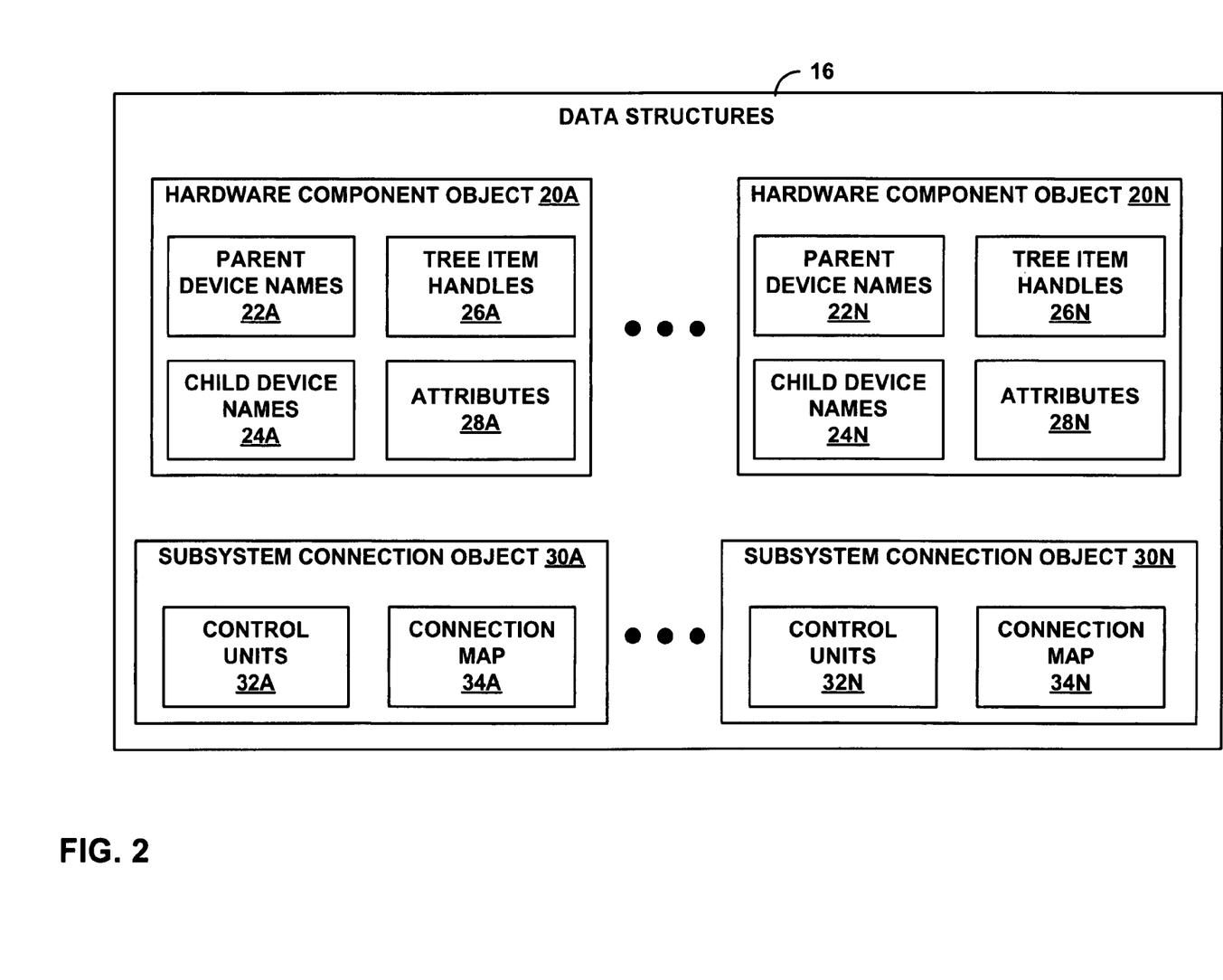
FIG. 2 is a block diagram illustrating a plurality of exemplary data structures that store configuration data associated with the computer system.

FIG. 2 is a block diagram illustrating exemplary embodiment of data structures 16 that store configuration data for computer system 12. In this example, data structures 16 include hardware component objects 20A-20N (collectively "hardware component objects 20") and subsystem connection objects 30A-30N (collectively "subsystem connection objects 30"). Data structures 16 may be stored within a memory module of computer system 12 similar to data structures 16 (FIG. 1). In general, hardware component objects 20 and subsystem connection objects 30 may be stored in memory as a map of computer programming objects that define the system configuration of computer system 12.

Specifically, each one of hardware component objects 20 stores configuration data for an individual one of hardware components 17 of computer system 12, and may be identified by the name of the associated individual hardware component. Exemplary physical hardware components include memory modules, power domains, I/O bridges, I/O bridge slots, I/O ports, I/O buses, I/O bus slots, I/O channels, control units, and peripheral hardware components such as printers, keyboards, tape drives, disk drives, and other peripheral I/O hardware components. In some embodiments, hardware component objects 20 may be dynamically created based on hardware definitions included in a text XML file loaded into computer system 12.

In this example, each of hardware component objects 20 stores a list of parent hardware component names 22A-22N (collectively "parent hardware component names 22"), a list of child hardware component names 24A-24N (collectively "child hardware component names 24"), a list of tree item handles 26A-26N (collectively "tree item handles 26"), and a list of attributes 28A-28N (collectively "attributes 28"), respectively. For any given hardware component object 20, the lists of parent hardware component names 22 and lists of child hardware component names 24 may store lists of pointers or other identifiers for any parent or child hardware components objects, respectively. As a result, hardware component objects 20 form a map of objects linked by pointers representing upward and downward connections, and thereby define a hierarchical tree-like structure representing hardware components 17 of computer system 12.

Additionally, the lists of tree item handles 26 may comprise a list of pointers that point directly to each specific position in the graphical hierarchy at which a node represents hardware component 17. As described, a hardware component 17 may have multiple upward associates (i.e., multiple parent hardware components) and, therefore, may be represented by two or more nodes of the graphical hierarchy. The list of pointers identifies the different locations.

Moreover, the lists of attributes 28 may comprise one or more attributes for the particular hardware component, such as the status of the individual hardware component, i.e., whether the individual hardware component is available for connection. Thus, by storing lists of parent hardware component names 22 and child hardware component names 24, configuration module 14 can efficiently retrieve and update configuration data for any of the parent or child hardware components of an individual hardware component.

In general, each of subsystem connection objects 30 stores configuration data that provides a mapping of connections between various hardware components 17 at two different levels of configuration within the hierarchical structure. For example, subsystem connection objects 30, as described herein, store configuration data that provide a mapping of channel to control unit connections. Subsystem connection objects 30 may be identified by the name of the associated subsystem and may also be created based on hardware definition included in a text XML file loaded into computer system 12 in a similar manner as hardware component objects 20.

In one embodiment, each of subsystem connection objects 30 includes a list of control units 32A-32N (collectively "control units 32") and a connection map 34A-34N (collectively "connection maps 34"). Control units 32 each includes a list of control units to which a channel may be connected. Connection maps 34 each stores a list of channels connected to a single control unit. Accordingly, a mapping of channel to control unit connections for a specific subsystem can be generated from the corresponding subsystem connection object 30.

Figure 3:
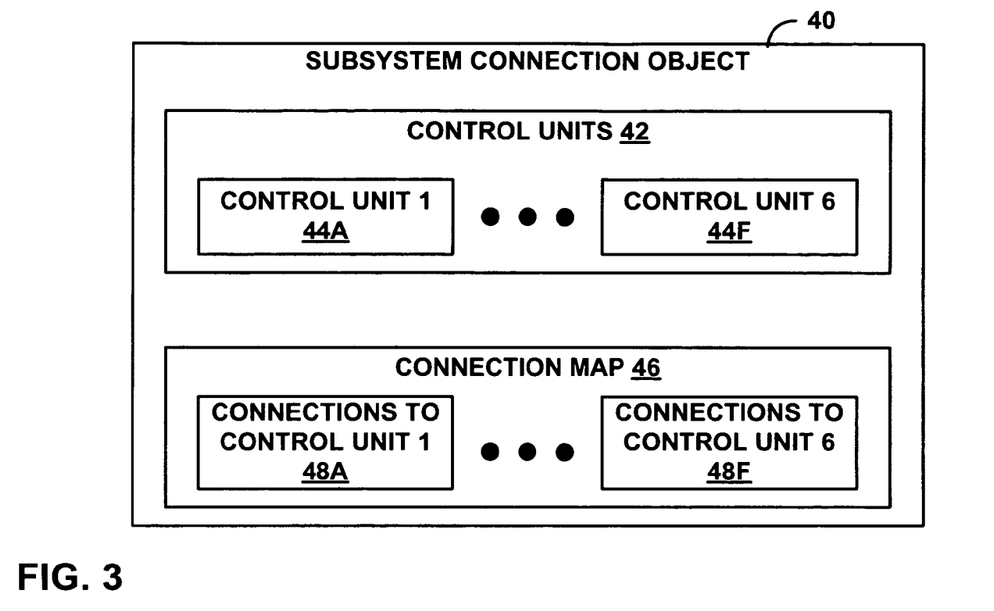
FIG. 3 is a block diagram illustrating an exemplary subsystem connection object of FIG. 2.

FIG. 3 is a block diagram illustrating an exemplary subsystem connection object 40 that stores configuration data from which a mapping of channel to control unit connections can be generated. Subsystem connection object 40 may define a specific subsystem within the hierarchical tree-like structure of computer system 12. The system configuration of computer system 12, such as an OS2200 system configuration, may include multiple subsystems each having different well defined rules of connectivity. In particular, the subsystem associated with subsystem connection object 40 may have multiple upward connections within the hierarchical tree-like structure, and each upward connection to a channel may define a different mapping of connections to control units. User interface software module 8 may visually represent each upward connection of control units to a channel as different a node within the graphical hierarchy. Accordingly, a subsystem node bridges the gap between a channel and one or more control units within the graphical hierarchy.

Subsystem connection object 40 includes a list of control units 42 and a connection map 46 to define the mapping of connections. In this example, the list of control units 42 stores a list of control units 44A, 44B, 44C, 44D, 44E, and 44F (collectively "control units 44") associated with subsystem connection object 40. In general, the list of control units 42 may include any number of control units 44; however, for illustrative purposes, six control units 44 (1-6) are shown in FIG. 3. Connection map 46 stores a map of connective objects 48A, 48B, 48C, and 48D (collectively "connection objects 48"), wherein each of connection objects 48 includes a list of connections to single one of control units 44 (1-6), respectively. Thus, connection map 46 may generally store any number of connection objects 48 equal to the number of control units stored in the list of control units 42.

As a result, a map of channel to control unit connections can be generated from subsystem connection object 40. More specifically, a map of connections between control units 44, i.e. control units 1-6, and a number of channels can be generated. Moreover, by storing channel to control unit connections in accordance with subsystem object 40, configuration module 14 may easily update channel to control unit connection based on input received from users 4 without having to traverse the hierarchical tree-like structure of computer system 12.

Figure 4:
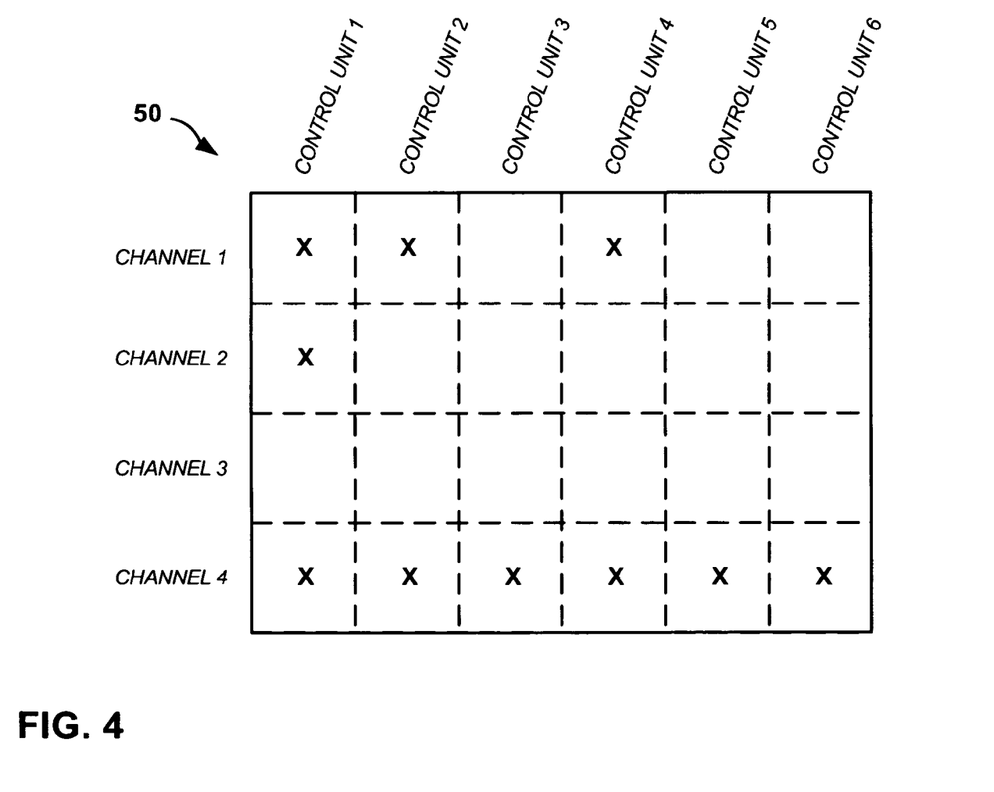
FIG. 4 illustrates an example mapping of control unit to channel connections.

FIG. 4 illustrates an example matrix 50 illustrating a mapping of control unit to channel connections generated from subsystem connection object 40 (FIG. 3). Specifically, matrix 50 illustrates the mapping of connections between control units 44 (1-6) and four separate channels (1-4). However, a matrix generated from a subsystem connection object may generally have size N×M, where N is the number of control units associated with the subsystem and M is the number of channels associated with the subsystem.

In the illustrated example, matrix 50 illustrates a connection between control units 44 and channels (1-4) with an "X" and thus illustrates that each instance of the subsystem associated with subsystem connection object 40 may have a different mapping of downward connections to control units 44. Furthermore, matrix 50 illustrates that there are currently no connections between control units 44 and channel 3. In this case, user interface software module 8 may display a node to visually represent an instance of the subsystem, thereby allowing users 4 to define connections between channel 3 and control units 44. As an example, users 4 may selectively define which of control units 44 to connect to channel 3 by interacting with the graphical hierarchy, e.g. entering input via a shortcut menu that presents the available control units to which channel 3 may connect. Alternatively, subsystem connection object 40 may not allow connections between control units 44 and channel 3. Thus, user interface software module 8 may not display a node within the graphical hierarchy. In any case, matrix 50 may be easily generated from subsystem connection object 40 and configuration module 14 may easily update configuration data stored in subsystem connection object 40 to selectively define the mapping of connections between control units 44 and a number of channels.

Figure 5:
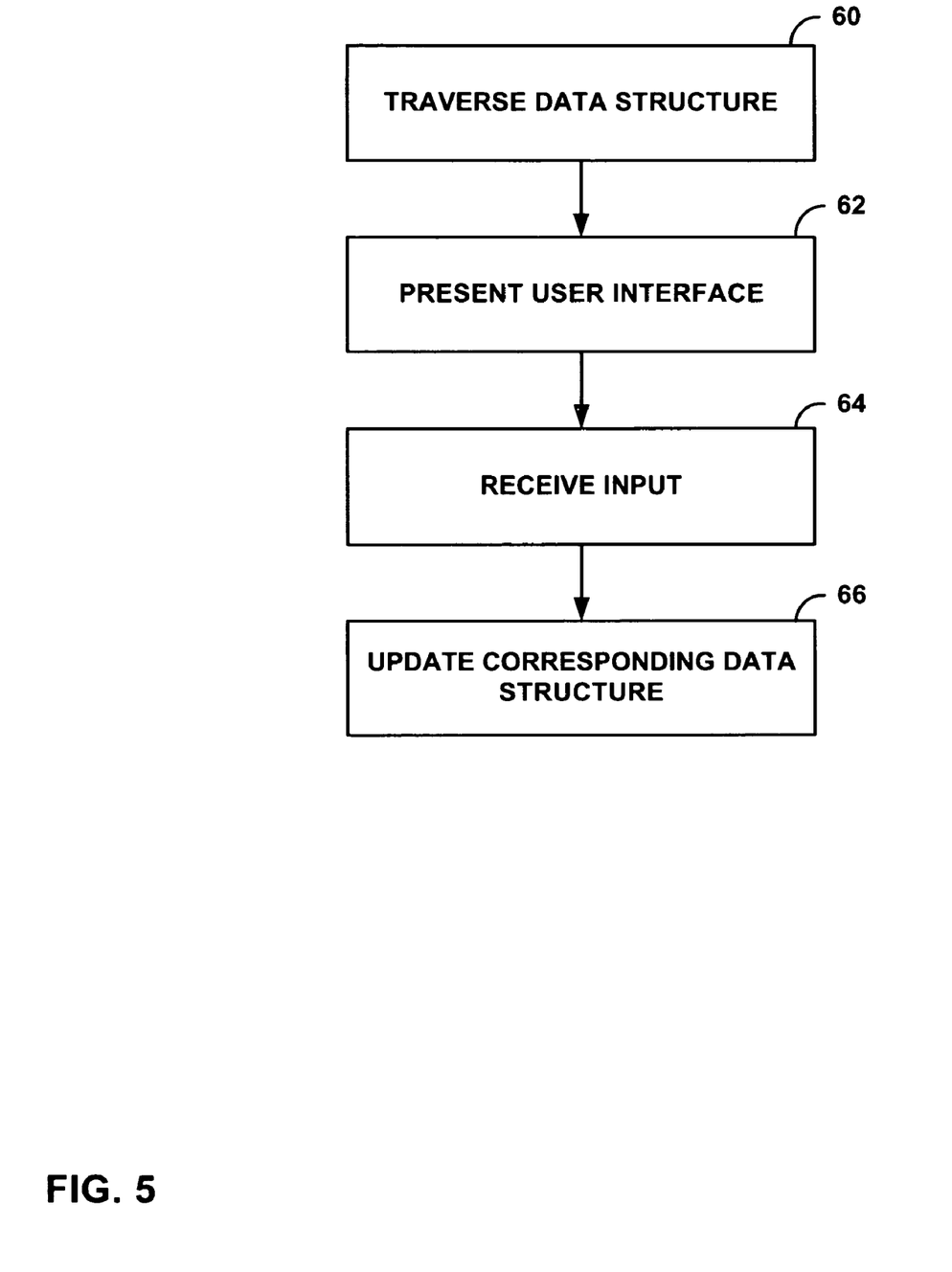
FIG. 5 is a flowchart that provides an overview of the described operation of the system.

FIG. 5 is a flowchart that provides an overview of the described operation of system 2 for managing the system configuration of computer system 12. As further described, the operation of system 2 is flexible and iterative as needed. In accordance with the described operation of system 2, users 4 may more easily and efficiently view, understand, and manage configuration data for computer system 12. In particular, users 4 may interact with a single screen of a user interface that displays a tree view of the hierarchical tree-like structure of computer system 12.

Users 4 may generally be authorized users who remotely manage configuration data for computer system 12. Initially, user interface software module 8 traverses data structures 16 (60) and presents the user interface (62) to display the graphical hierarchy as a graphical representation of the hierarchical tree-like structure of computer system 12. Since configuration module 14 may maintain a single data structure for each individual hardware component 17 of computer system 12, user interface software module 8 may traverse data structures 16 in order of highest level of configuration to the lowest level of configuration. In this manner, user interface software module 8 may retrieve the configuration data stored in data structures 16 and display the full hierarchical tree-like structure of computer system 12.

In any case, user interface software module 8 displays the graphical hierarchy as a plurality of nodes arranged to graphically represent the upward connections from an individual hardware component to a parent hardware component. Any individual hardware component 17 of computer system 12 may have multiple upward connections to separate parent hardware components. As a result, an individual hardware component 17 may be presented by more than one node in the graphical hierarchy. In addition, the user interface may also include visual aids to indicate whether a particular node may be expanded to display downward connections or whether the hardware component associated with a node is available for connection, i.e., the connectivity status of the hardware component. Thus, users 4 may interact with the user interface to trace connections between the highest-level node, i.e. the system node, to the lowest-level nodes that are associated with I/O peripheral hardware components by simply expanding and collapsing nodes.

User interface software module 8 may then receive input (64) from users 4 to add, delete, update, and generally manage configuration data stored for computer system 12. For example, users 4 may interact with dynamic, task-oriented shortcut menus provided by the user interface to enter input. In particular, users 4 may select any node within the graphical hierarchy via a right mouse click, thereby causing user interface software module 8 to present a context-sensitive shortcut menu. The shortcut menu may allow users 4 to select one of a number of configuration management operations associated with the selected node. As an example, a user 4 may elect to remove the node, add an upward or downward connection to a node associated with a different hardware component, or change an attribute associated with the selected node.

In response, configuration module 14 updates data structures 16 (66). Specifically, configuration software module 14 updates the data structure associated with the selected node, as well as any other appropriate data structures, based on the received input. User interface software module 8 refreshes the user interface to reflect updated configuration data. In particular, configuration module 14 may efficiently update configuration data stored based on the received input since all configuration data for an individual hardware component is stored within a single data structure. Additionally, user interface modules may efficiently refresh the user interface since the data structure stores a list of pointers to each position within the graphical hierarchy where an instance of the hardware component is located. Thus, configuration module 14 and user interface software module 8 may directly update and display configuration data without necessarily traversing the entire hierarchical tree-like structure. Moreover, configuration module 14 may access configuration data in the selected data structure and any data structure connected to the selected hardware component without traversing the entire hierarchical structure since each data structure stores a list of upward and downward connections to every parent and child hardware component, respectively. In this manner, users 4 may continually interact with a single screen of the user interface to manage the entire configuration data associated with hardware components 17 of computer system 12.

Figure 6:
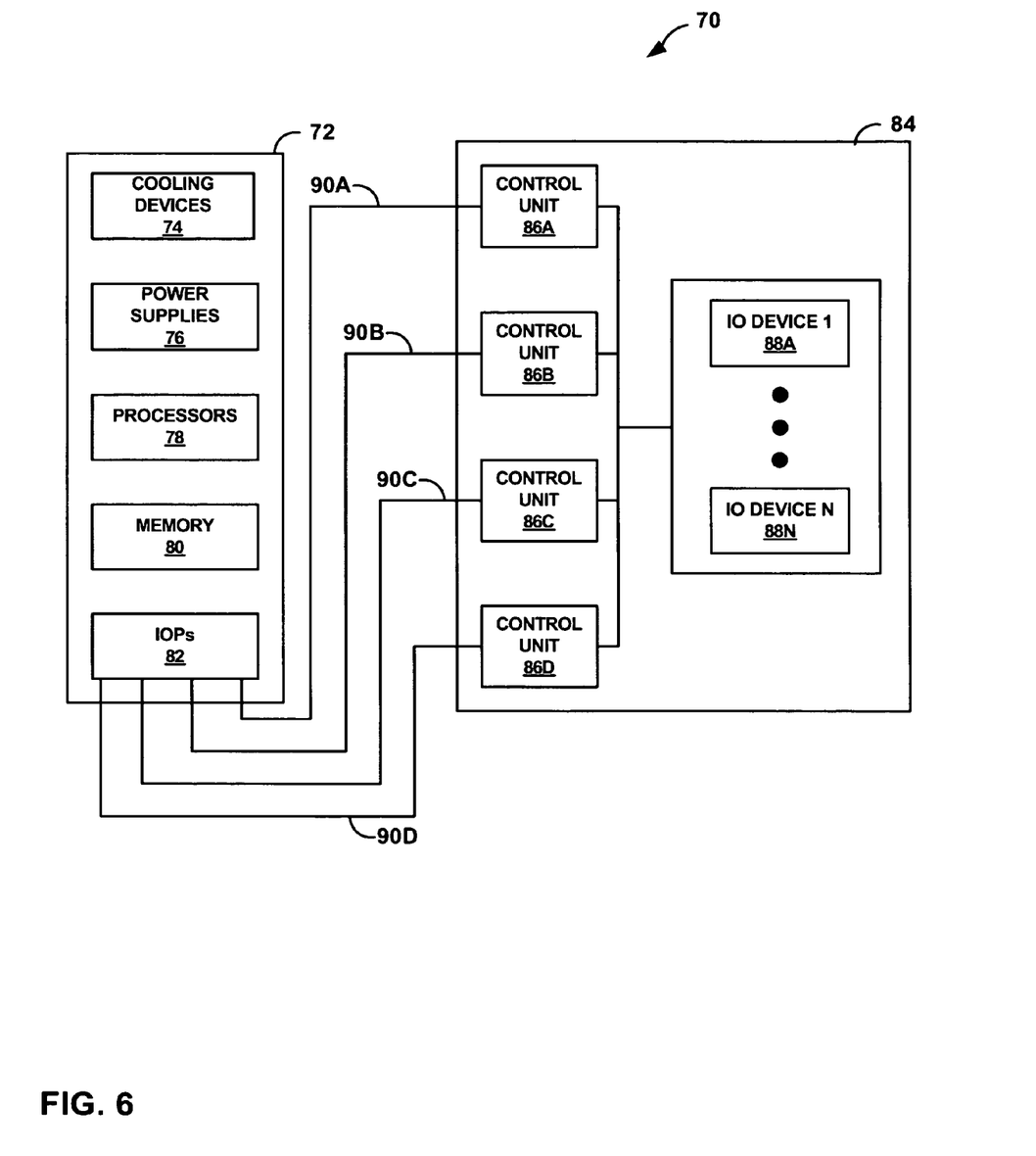
FIG. 6 is a block diagram illustrating an exemplary hardware architecture of the computer system.

FIG. 6 is a block diagram illustrating an exemplary hardware architecture of a computer system 70 in which an individual hardware component has multiple upward connections to separate parent hardware components. For example, computer system 70 may comprise a ClearPath Plus™ server with an OS2200 system configuration or other server developed by Unisys Corporation of Blue Bell, Pa. Accordingly, computer system 70 may be viewed as a hardware architecture for computer system 12 (FIG. 1), and a user 4 may manage configuration data for computer system 70 using the described techniques.

Computer system 60 generally includes a central complex 72 that houses hardware components for processing information, and a peripheral structure 84 which may comprise an additional cabinet that houses I/O hardware components for inputting and outputting information to and from central complex 72. In the illustrated example, central complex 72 houses cooling devices 74, power supplies 76, processors 78, memory 80, and IOPs 82. Cooling devices 74 may include liquid cooling hardware components, fans, and other hardware components. Power supplies 76 may comprise one or more uninterruptible power supplies (UPS), batteries, or other power sources. Processors 78 may include one or more arithmetic logic units, control units, and instruction processors that perform operations and store and retrieve information to and from memory 80 via a plurality of internal and external buses (not shown). Memory 80 may generally include a plurality of random access memory modules, read only memory modules, registers, and other main storage components. IOPs 82 interface with processors 78 and receive information from control units 86A, 86B, 86C, and 86D (collectively "control units 86") via channels 90A, 90B, 90C, and 90D (collectively "channels 90"). IOPs 82 are shown in FIG. 6 as having four channels 90 which connect to control units 86. However, IOPs 82 may generally connect to any number of control units via multiple channels. Control units 86 are housed within peripheral structure 84 and connect to any combination of I/O devices 88A-88D (collectively "I/O devices 88"). I/O devices 88 may include external storage hardware components, such as tape drives and disk drives.

Figure 7:
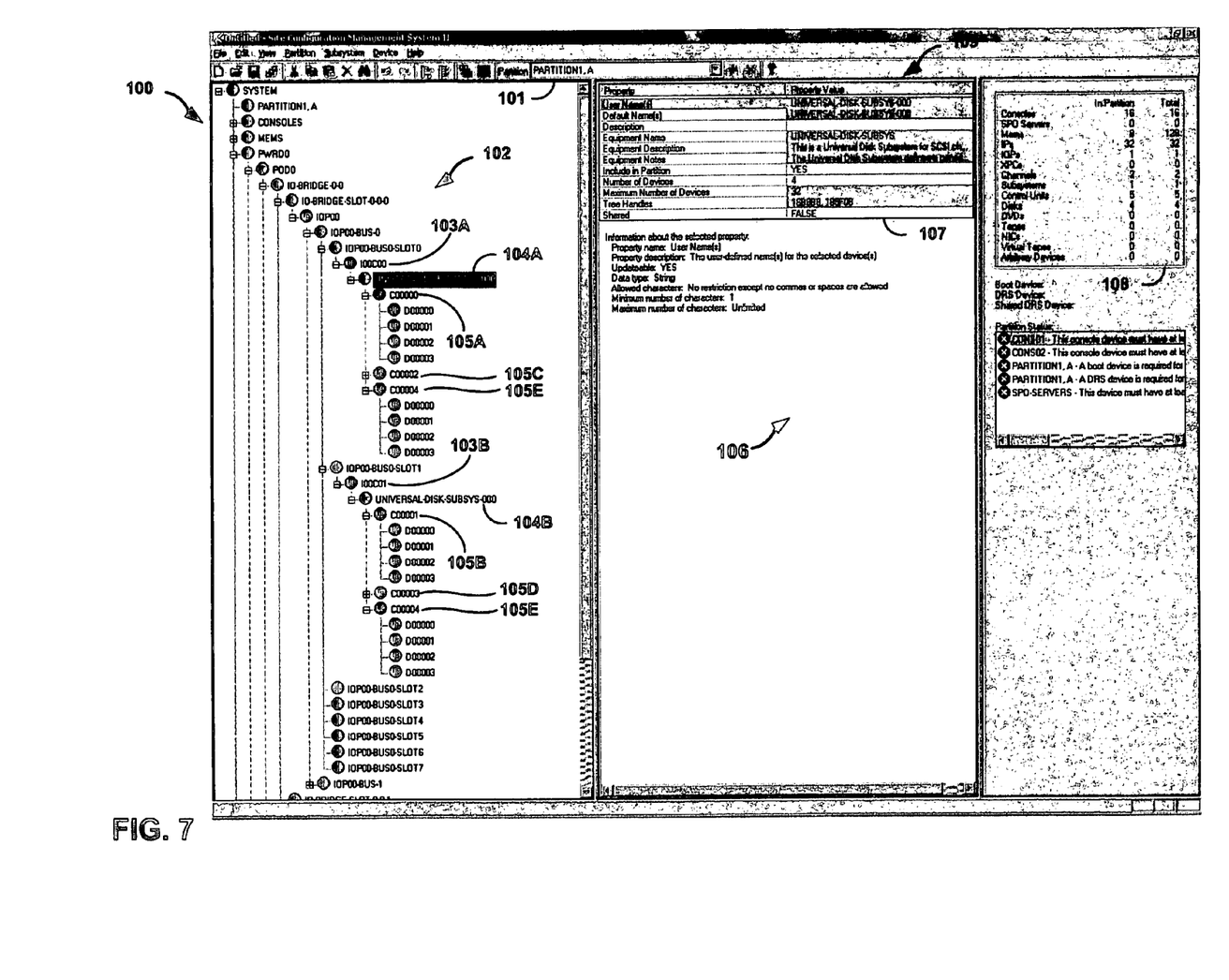
FIGS. 7 and 8 are screen illustrations of exemplary user interfaces presented by the system.

FIG. 7 is a screen illustration depicting an example user interface 100 with which users 4 may interact to manage configuration data for a computer system, such as computer system 12 (FIG. 1). In this example, user interface 100 comprises a first portion that includes graphical tree 102 that visually represents the hierarchical tree-like structure for computer system 12. User interface 100 further includes a second portion 109 that provides a text description of configuration data for a system configuration of computer system 12.

User interface 100 generally provides a graphical representation of the hierarchical tree-like structure of computer system 12 with which users 4 may interact to view parent/child relationships between various levels of physical and symbolic hardware components. In particular, user interface 100 displays a graphical tree 102 of a specific partition, i.e. "PARTITION1, 1", of computer system 12. Thus, users 4 may trace connections between various levels of hardware components 17 by simply expanding and collapsing nodes (illustrated as circles within tree 102). In some embodiments, computer system 12 may include many different partitions each comprising a different grouping of hardware and logical association of hardware components 17. In any case, users 4 may select which partition of computer system 12 to display via the pull-down menu 101 located at the top of user interface 100.

Generally, when a user 4 first logs onto a computing hardware component 6, user interface software module 8 automatically generates user interface 100 to include nodes associated with hardware components 17 which the user can view or modify. As an example, user interface 100 may display nodes to represent the selected partition, consoles or computing devices 6 connected to the partition, memory modules, power domain, and I/O bridges, I/O bridge slots, IOPs, IOP buses, IOP bus slots, and IOP channels.

In the illustrated example, users 4 have already defined connections for subsystem nodes 104A and 104B. Subsystem nodes 104A and 104B are an example of separate instances of the same subsystem, i.e. UNIVERSAL-DISK-SUBSYS- 000. Thus, although represented by two different nodes 104A and 104B, configuration data associated with the UNIVERSAL-DISK-SUBSYS-000 subsystem is stored in a single data structure. In this example, subsystem nodes 104A and 104B provide a map of channel to control unit connections for channel 100C00 103A and channel 100C01 103B, respectively. Specifically, subsystem nodes 104A and 104B each have a different mapping of downward connections to control units 105A-105E. More specifically, subsystem node 104A maps connections from channel 103A to control unit C00000 105A, control unit C00002 105C, and control unit C00004 105E and subsystem node 104B maps connections from channel 103B to control unit C00001 105B, control unit C00003 105D, and control unit 105E.

To further aid users 4, user interface 100 displays a visual aid within each node to indicate the connectivity of the associated hardware component. As an example, IOP node IOP00, channel nodes 103A and 103B, and control units 105A-105E include a visual aid "UP" indicating that the associated hardware component may have one or more upward connections available.

User interface 100 also displays information screen 106 to display various configuration data that cannot be graphically represented. Specifically, information screen 106 displays a dual column table 107 that provides a text representation of configuration data for a selected node in graphical tree 102. In the illustrated example, table 107 displays a list of properties in the left-hand column and the corresponding property values in the right-hand column. User interface module 100 may further display a table 108 providing an over view of the number of hardware components in the selected partition and the total number of hardware components in computer system 12.

Figure 8:
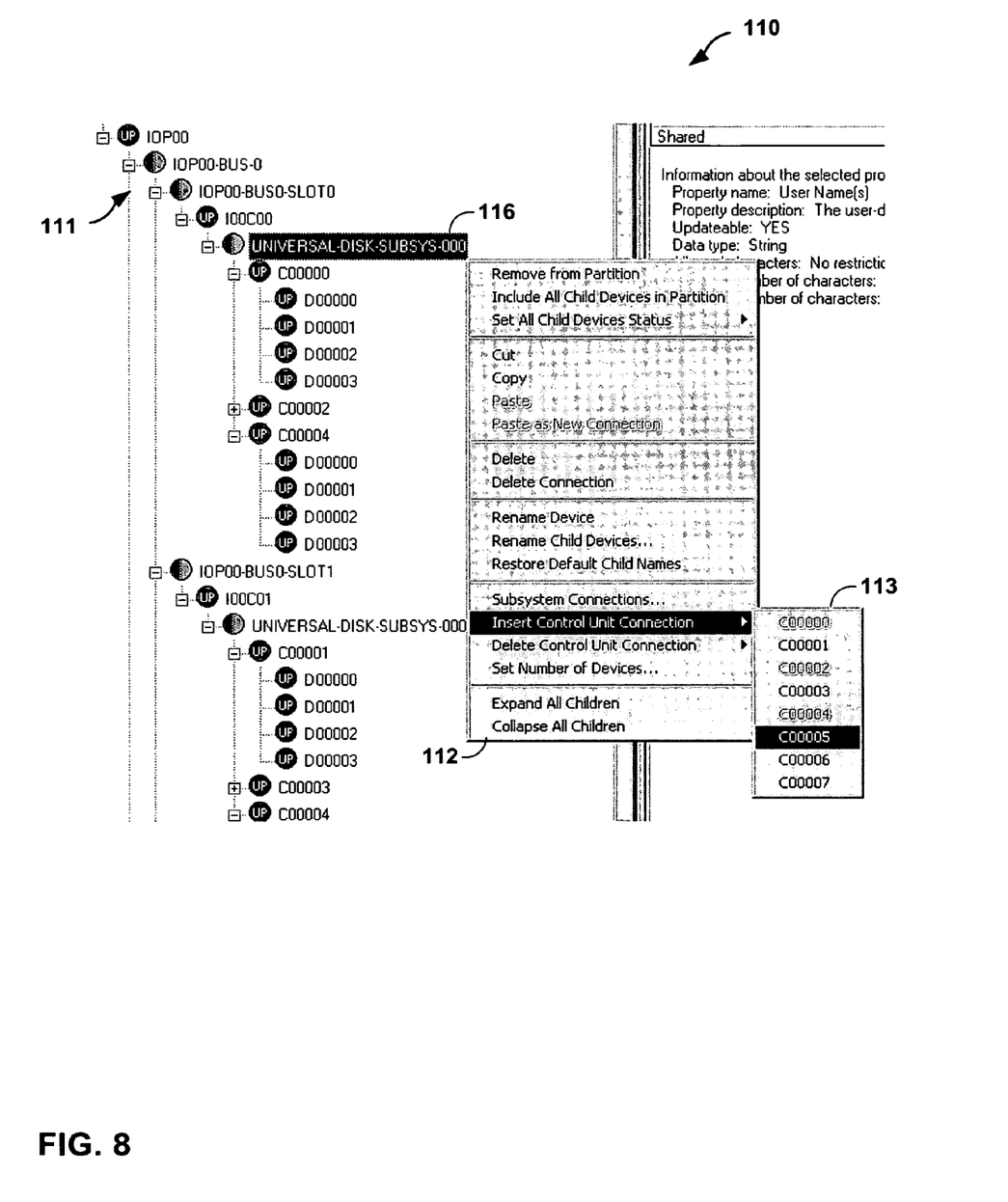

FIG. 8 is a magnified portion of a screen illustration depicting a context-sensitive shortcut menu 112 within an example user interface 110 that displays a graphical tree 111 of the hierarchical tree-like structure of computer system 12. In general, users 4 may select any node within tree model 111 via a right mouse click, or other command associated with an input mechanism, to cause a corresponding shortcut menu to appear.

In the illustrated example, shortcut menu 112 provides a list of a number of operations associated with configuration management tasks for the selected node, i.e., subsystem node UNIVERSAL-DISK-SUBSYS-000 116. When a user selects one of the listed operations, configuration management module 14 updates configuration data stored in appropriate data structures and user interface module 8 updates user interface 110 based on the received input.

As shown in FIG. 8, user interface 110 may present a sub-shortcut menu 113 in response to a user selecting to insert a control unit connection. Sub-shortcut menu 113 may display all control units associated with a subsystem node 116. The control units that are not available for connection are grayed-out to represent their unavailability. In the event that a user selects to create a connection for connecting control unit C00005 to subsystem node 116, configuration module 14 may update configuration data stored in the data structure associated with subsystem node 116 and user interface software module 8 may refresh user interface 110 by displaying a node identified by C00005 under subsystem node 116. In particular, configuration module 14 may update the subsystem connection object 40 associated with subsystem node 116 by updating the connection map 46 based on the input. More specifically, configuration module 14 may update connection object 48 associated with control unit 5 to include a connection to channel 100C00. Configuration module 14 may also update the hardware component object 20 associated with control unit C00005 by adding an upward connection to the list of parent hardware component names 22, adding a tree item handle 26 identifying the position within tree model 111, and updating appropriate attributes 28.

Various embodiments of the invention have been described. These and other embodiments are within the scope of the following claims.

The invention claimed is:

1. A computer-implemented method comprising:
   maintaining, with a mainframe computer system, one or more data structures to store configuration data of the mainframe computer system having a plurality of partitions, wherein each partition comprises a logical grouping of one or more of a plurality of hardware components, and
   wherein the hardware components include channels, subsystems, control units, and input-output (I/O) hardware components; and
   presenting, with the mainframe computer system, a user interface to graphically display the configuration data in a hierarchical tree-like structure in a single window,
   wherein the hierarchical tree-like structure is graphically displayed to include a plurality of nodes, wherein the plurality of nodes comprise:
      a first set of the plurality of nodes that each corresponds to a different one of the plurality of partitions;
      a second set of the plurality of nodes visually represented in child relationships with one or more of the first set of nodes, each of the second set of nodes corresponding to one of the I/O hardware components;
      a third set of the plurality of nodes visually represented in child relationships with one or more of the second set of nodes, each of the third set of nodes corresponds to one of the channels;
      a fourth set of the plurality nodes visually represented in child relationships with one or more of the third set of nodes, each of the fourth set of nodes corresponds to one of the subsystems; and
      a fifth set of the plurality nodes visually represented in child relationships with one or more of the fifth set of nodes, each of the fifth set of nodes corresponding to one of the control units,
   wherein one or more of the subsystem nodes are symbolic hardware components that each represents at least one upward connection from one or more the channels to one or more of the control units,
   wherein the configuration data for a same individual subsystem includes a man of the upward connections represented by the subsystem from the one or more channels to the one or more control units, and
   wherein at least two different ones of the fourth set of subsystem nodes each graphically represent and provide access to the entire configuration data for the same individual subsystem.

2. The method of claim 1, wherein each of the data structures stores the configuration data associated with a corresponding one of the hardware components of the computer system.

3. The method of claim 1, further comprising maintaining the configuration data for at least one of the hardware components to include:
   (i) a list of two or more upward connections to a parent hardware component;
   (ii) a list of one or more downward connections to a child hardware component;

(iii) one or more attributes associated with the individual hardware component; and (iv) an array of one or more tree item handles, wherein each tree item handle identifies a position associated with one of the nodes within the hierarchical tree-like structure corresponding to the hardware component.

4. The method of claim 3, wherein an upward connection to a parent hardware component comprises a hardware component name associated with the parent hardware component, wherein a downward connection comprises a hardware component name associated with the child hardware component.

5. The method of claim 3, wherein an attribute comprises a connectivity status of the individual hardware component that indicates whether the associated hardware component is currently available for connection, wherein the user interface graphically displays the configuration data by graphically presenting the connectivity status alongside the associated hardware component to indicate whether the associated hardware component is currently available for connection.

6. The method of claim 1, wherein the configuration data for the same individual subsystem includes a list of one or more of the control units that are associated with the subsystem and an object map that includes an object for each of the control units of the list and each of the objects includes a list of the channels of the computer system connected to one of the control units.

7. The method of claim 1, wherein maintaining one or more data structures comprises:

receiving input associated with one of the hardware components; and updating the configuration data stored in the data structures associated with the hardware component based on the input.

8. The method of claim 7, wherein receiving input comprises:

receiving input selecting one of the nodes of the hierarchical tree-like structure;

presenting a menu of items to the user via the user interface in response to the selection; and receiving a configuration command associated with one of the items selected by the user.

9. The method of claim 7, wherein updating the configuration data comprises accessing the data structure associated with the individual hardware component by matching the input to a name associated with a data structure and updating the configuration data in the data structure based on the input.

10. The method of claim 1, wherein processing the user interface to display the configuration data comprises retrieving the configuration data stored in each of the data structures and displaying the configuration data for each hardware component of the computer system in the hierarchical tree-like structure via the user interface.

11. A configuration management system comprising:

a host mainframe computer system that includes a configurable hardware architecture comprising a plurality of hardware components, wherein the mainframe computer system is configured to include one or more partitions that each defines a logical grouping of one or more of the plurality of hardware components, and wherein the hardware components include channels, subsystems, control units, and input-output (I/O) hardware components;

a configuration software module executing on the host computer system, wherein the configuration software module maintains one or more data structures to store configuration data for the host mainframe computer system;

a user interface software module executing on the host computer system to present a user interface that graphically displays the configuration data in a hierarchical tree-like structure in a single window, wherein the hierarchical tree-like structure includes a plurality of nodes, wherein the plurality of nodes comprise:

a first set of the plurality of nodes that each corresponds to a different one of the plurality of partitions;

a second set of the plurality of nodes visually represented in a child relationships with one or more of the first set of nodes, each of the second set of nodes corresponding to one of the I/O hardware components;

a third set of the plurality of nodes visually represented in child relationships with one or more of the second set of nodes, each of the third set of nodes corresponds to one of the channels;

a fourth set of the plurality nodes visually represented in child relationships with one or more of the third set of nodes, each of the fourth set of nodes corresponds to one of the subsystems; and a fifth set of the plurality nodes visually represented in child relationships with one or more of the fifth set of nodes, each of the fifth set of nodes corresponding to one of the control units, wherein one or more of the subsystem nodes are symbolic hardware components that each represents at least one upward connection from one or more the channels to one or more of the control units, wherein the configuration data for a same individual subsystem includes a map of the upward connections represented by the subsystem from the one or more channels to the one or more control units, and wherein two or more of the fourth set of subsystem nodes each graphically represent and provide access to the entire configuration data for the same individual subsystem.

12. The system of claim 11, wherein the configuration software module maintains each of the data structures to store configuration data associated with a different one of the hardware components of the host computer system.

13. The system of claim 11, wherein each of the data structure stores configuration data associated with a corresponding one of the hardware components of the computer system.

14. The system of claim 11, wherein the configuration software module stores configuration data for at least one of the hardware components to include:

(i) a list of two or more upward connections to a parent hardware component;

(ii) a list of one or more downward connections to a child hardware component;

(iii) one or more attributes associated with the hardware component; and (iv) an array of one or more tree item handles, wherein each tree item handle identifies a position associated with one of the nodes within the hierarchical tree-like structure corresponding to the hardware component.

15. The system of claim 11,
wherein the configuration software module stores configuration data for the same individual subsystem within one of the data structures, and
wherein the configuration software module maintains the configuration data for the same individual subsystem to include a list of one or more of the control units that are associated with the subsystem and an object map, and
wherein the object map includes an object for each of the control units of the list and each of the objects includes a list of the channels of the computer system connected to one of the control units.

16. The system of claim 11,
wherein the user interface software module presents a graphical user interface by which the user provides input, and
wherein the configuration software module updates configuration data based on the input.

17. The system of claim 16, wherein the configuration software module accesses the data structure matching the input to a name associated with one of the nodes of the data structure, and updates the configuration data stored in the accessed data structure based on the input.

18. A system for managing a configuration of a mainframe computer system comprising:
means for maintaining one or more data structures to store configuration data associated with a plurality of hardware components of the mainframe computer system,
wherein the mainframe computer system is configured to include one or more partitions that defines a logical grouping of one or more of the plurality of hardware components, and
wherein the hardware components include channels, subsystems, control units, and input-output (IO) hardware components; and
means for presenting a user interface that displays in a single computer window a graphical, hierarchical tree-like structure having a plurality of nodes to provides access to the configuration data for the hardware components of the mainframe computer system,
wherein the plurality of nodes comprise:
a first set of the plurality of nodes that each corresponds to a different one of the plurality of partitions;
a second set of the plurality of nodes visually represented in child relationships with one or more of the first set of nodes, each of the second set of nodes corresponding to one of the I/O hardware components;
a third set of the plurality of nodes visually represented in child relationships with one or more of the second set of nodes, each of the third set of nodes corresponds to one of the channels;
a fourth set of the plurality nodes visually represented in child relationships with one or more of the third set of nodes, each of the fourth set of nodes corresponds to one of the subsystems; and
a fifth set of the plurality nodes visually represented in child relationships with one or more of the fifth set of nodes, each of the fifth set of nodes corresponding to one of the control units,
wherein one or more of the subsystem nodes are symbolic hardware components that each represents at least one upward connection from one or more the channels to one or more of the control units,
wherein the configuration data for a same individual subsystem includes a map of the upward connections represented by the subsystem from the one or more channels to the one or more control units, and
wherein at least two different ones of the fourth set of subsystem nodes each graphically represent and provide access to all of the configuration data for the same individual subsystem.

* * * * *